US010492019B2

(12) United States Patent
Briggs et al.

(10) Patent No.: US 10,492,019 B2
(45) Date of Patent: Nov. 26, 2019

(54) BINAURAL AUDIO CALIBRATION

(71) Applicant: International Business Machines Corporation, Armonk, NY (US)

(72) Inventors: Benjamin David Briggs, Albany, NY (US); Lawrence A. Clevenger, Hopewell Junction, NY (US); Leigh Anne Hodges Clevenger, Poughkeepsie, NY (US); Christopher J. Penny, Albany, NY (US); Michael Rizzolo, Albany, NY (US); Aldis Gunars Sipolins, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 15/442,866

(22) Filed: Feb. 27, 2017

(65) Prior Publication Data

US 2018/0249271 A1 Aug. 30, 2018

(51) Int. Cl.
*G06F 17/00* (2019.01)
*H04S 7/00* (2006.01)

(52) U.S. Cl.
CPC ........... *H04S 7/304* (2013.01); *H04S 2400/11* (2013.01); *H04S 2420/01* (2013.01)

(58) Field of Classification Search
CPC ............................. H04S 7/301; H04S 2420/01
See application file for complete search history.

(56) References Cited

U.S. PATENT DOCUMENTS

| | | | | |
|---|---|---|---|---|
| 6,181,800 | B1 * | 1/2001 | Lambrecht .............. | H04S 1/002 381/17 |
| 8,831,255 | B2 | 9/2014 | Crawford et al. | |
| 9,191,764 | B2 | 11/2015 | Baughman et al. | |
| 9,459,276 | B2 | 10/2016 | Joseph | |
| 2013/0041648 | A1 * | 2/2013 | Osman .................... | H04S 7/304 704/2 |
| 2016/0134987 | A1 | 5/2016 | Gorzel et al. | |

FOREIGN PATENT DOCUMENTS

| | | | |
|---|---|---|---|
| CN | 102572676 | B | 4/2016 |
| CN | 105872928 | A | 8/2016 |
| CN | 105872940 | A | 8/2016 |

OTHER PUBLICATIONS

Mel, et al. "The NIST Definition of Cloud Computing". Recommendations of the National Institute of Standards and Technology. Nov. 16, 2015.

(Continued)

*Primary Examiner* — Fan S Tsang
*Assistant Examiner* — David Siegel
(74) *Attorney, Agent, or Firm* — Kevin M. Jordan, Esq.; McGinn IP Law Group, PLLC

(57) ABSTRACT

A binaural audio calibration method, system, and computer program product for using behavioral data and sensor data to calibrate binaural audio to a specific user and creating a personalized binaural audio which can lead to greater immersion and allow user attention to be more effectively controlled.

20 Claims, 7 Drawing Sheets

BINAURAL AUDIO CALIBRATION METHOD 100

(56) References Cited

OTHER PUBLICATIONS

Spagnol, S., Geronazzo, M., Rocchesso, D., & Avanzini, F. (2013). "Extraction of pinna features for customized binaural audio delivery on mobile devices." *Proceedings of International Conference on Advances in Mobile Computing & Multimedia*, 514.

Disclosed anonymously. (2005). "Apparatus and Methods for Efficient Deployment of Head-Related Transfer Functions." *IPCOM000126020D*, IP.COM Prior Art Database Technical Disclosure. DoCoMo Communications Laboratories USA, Inc.

Kares, J., & Larcher, V. (2016). "Streaming Immersive Audio Content". Audio Engineering Society Conference Paper, Presented at the Conference on Audio for Virtual and Augmented Reality, Sep. 30-Oct. 1, 2016, Los Angeles, CA, USA, 8 Pages.

* cited by examiner

BINAURAL AUDIO CALIBRATION METHOD 100

FIG. 4

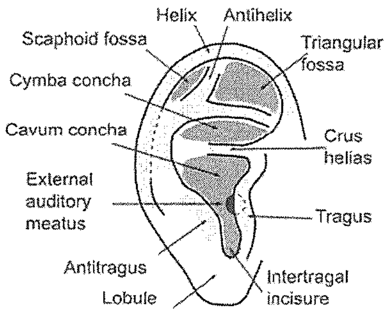

| | |
|---|---|
| $d_1$ | cavum concha height |
| $d_2$ | cymba concha height |
| $d_3$ | cavum concha width |
| $d_4$ | fossa height |
| $d_5$ | pinna height |
| $d_6$ | pinna width |
| $d_7$ | intertragal incisure width |
| $d_8$ | cavum concha depth |
| $\theta_1$ | pinna rotation angle |
| $\theta_2$ | pinna flare angle |

FIG. 5

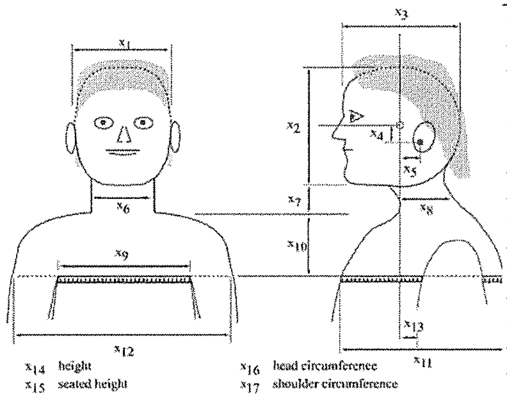

| Var | Measurement |
|---|---|
| $x_1$ | head width |
| $x_2$ | head height |
| $x_3$ | head depth |
| $x_4$ | pinna offset down |
| $x_5$ | pinna offset back |
| $x_6$ | neck width |
| $x_7$ | neck height |
| $x_8$ | neck depth |
| $x_9$ | torso top width |
| $x_{10}$ | torso top height |
| $x_{11}$ | torso top depth |
| $x_{12}$ | shoulder width |
| $x_{13}$ | head offset forward |
| $x_{14}$ | height |
| $x_{15}$ | seated height |
| $x_{16}$ | head circumference |
| $x_{17}$ | shoulder circumference |

BINAURAL AUDIO CALIBRATION

BACKGROUND

The present invention relates generally to a binaural audio calibration method, and more particularly, but not by way of limitation, to using behavioral data and sensor data to calibrate binaural audio to a specific user.

SUMMARY

In an exemplary embodiment, the present invention can provide a computer-implemented binaural audio calibration method of a virtual reality device, the method including in a setup phase, calibrating the virtual reality device for a first user based on a feedback of a head related transfer function controlling a difference between a perceived sound location by the first user compared to a spectral tone location and a default ear model to determine a user ear model, in an operating phase, monitoring the difference between the perceived sound location by the first user and the spectral tone location to dynamically calibrate the user ear model using the head related transfer function during an operation of the virtual reality device, and creating a first user profile for the calibrated user ear model.

One or more other exemplary embodiments include a computer program product and a system.

BRIEF DESCRIPTION OF THE DRAWINGS

Aspects of the invention will be better understood from the following detailed description of the exemplary embodiments of the invention with reference to the drawings, in which:

FIG. 4 exemplarily depicts ear size variables used in in accordance with some embodiments of the invention;

FIG. 5 exemplarily depicts human dimension variables used in accordance with some embodiments of the invention;

DETAILED DESCRIPTION

Figure 1:
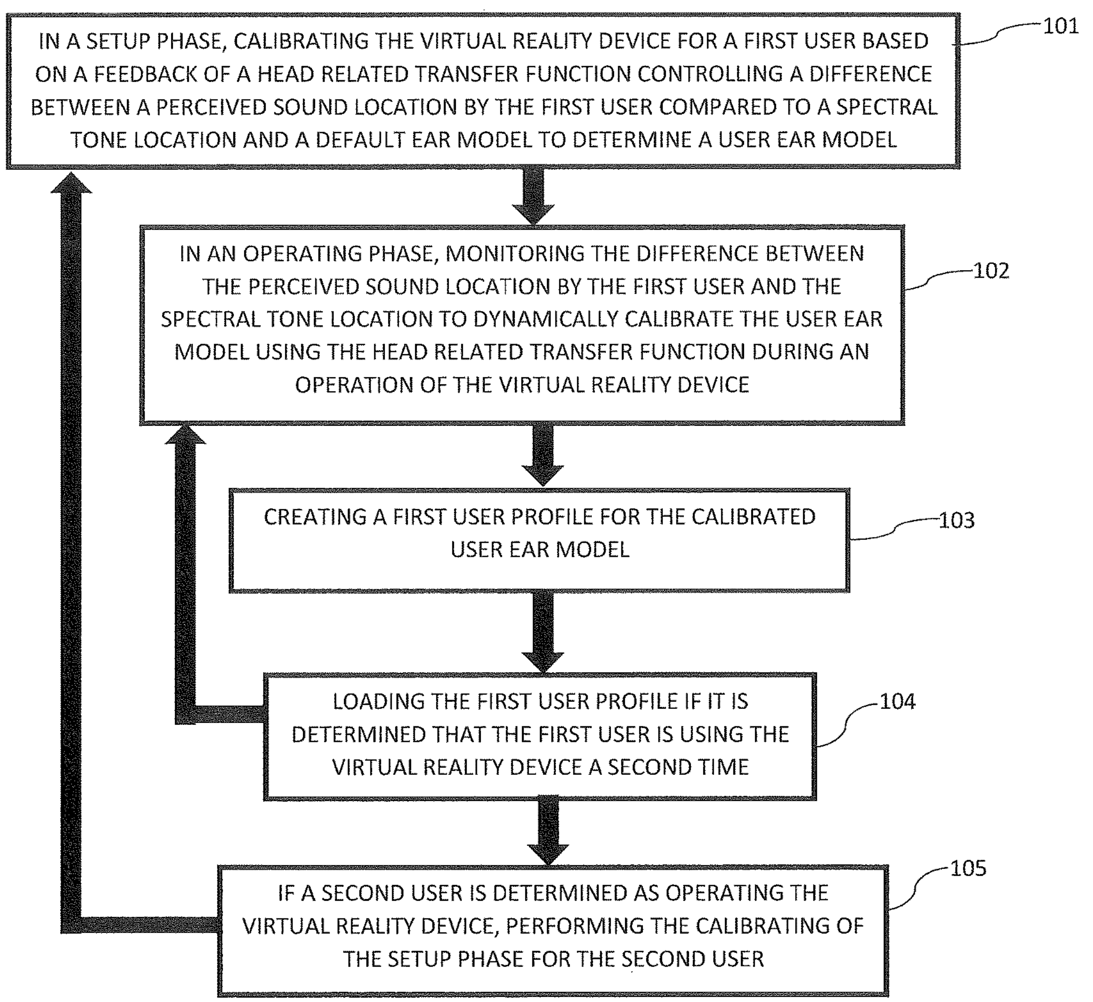
FIG. 1 exemplarily shows method in accordance with some embodiments of the invention.

Although examples of the present invention will be described in more detail below, the invention is capable being practiced and carried out in various ways in addition to the examples described. It is thus to be understood that the invention is not limited in its application to the details of construction and/or the arrangements of the components set forth in the following description or illustrated in the drawings. Also, that the phraseology and terminology employed herein, as well as the abstract, are for the purpose of description and should not be regarded as limiting.

As such, those skilled in the art will appreciate that the present invention may readily be utilized as a basis for the designing of other structures, methods and systems. It is important, therefore, that the claims appended hereto be regarded as including such equivalent constructions insofar as they do not depart from the spirit and scope of the present invention.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity.

FIG. 1 exemplarily shows a method in accordance with some embodiments of the invention. By way of preview to this example, a virtual reality (VR) device is initially programmed (prior to the setup phase), based on a default ear model e.g., based on an average human ear. As is exemplarily shown and will be discussed in more detail with reference to FIGS. 4-5, the default ear model can include an average value for the variables of the size of a human ear (i.e., and a positional relation of the human ear to other parts of the human body. However, a location of sound in a virtual reality simulation can be incorrect (or offset from the actual location) e.g., when the values of the default/average ear model are different from a model of the actual user's ear.

As depicted, in step 101, a virtual reality device (i.e., a device that a user can use to immerse themselves in a virtual reality simulation) is calibrated, in a setup phase, for a user based on a head related transfer function (HRTF) controlling a perceived sound location by the user, an actual sound location, and a default ear model to determine a user ear model.

The HRTF varies as a function of frequency, angle of incidence and distance. It is noted that the HRTF in the time domain (t) is represented as:

$$x_{L,R}(t)=h_{L,R}(t)*x(t)=\int_{-\infty}^{\infty}h_{L,R}(t-\tau)x(\tau)d\tau.$$

Where:

| Variable | Definition (time domain) |
|---|---|
| $x_{L,R}$ (t) | Sound pressure at ear (Left and Right) |
| t, τ | Time |
| $h_{L,R}$ (t) | Head related transfer function (Left and Right) |
| x (t) | Sound pressure at source location |

And, the HRTF in the frequency domain is represented as:

$$X_{L,R}(\omega)=\mathcal{F}\,(h_{L,R}(t)x(t)=H_{L,R}(\omega)X(\omega)$$

Where:

| Variable | Definition (frequency domain) |
|---|---|
| $X_{L,R}$ (ω) | Sound pressure at ear (Left and Right) |
| ω | Angular frequency (2π * Frequency) |
| F | Fourier transform |
| $H_{L,R}$ (ω) | Head related transfer function (Left and Right) |
| X (ω) | Sound pressure at source location |

In other words, during the setup phase, the virtual reality device can be calibrated for a specific user by determining the user ear model using a head related transfer function (HRTF). The setup phase starts with a default ear model such that the calibration matches the perceived sound location with the actual sound location, e.g., within a predetermined tolerance (i.e., 1° to 5° or as determined by the manufacturer).

Upon completion of the setup phase of step 101, in step 102, the head related transfer function (HRTF) can be continuously monitored during the operation of the virtual reality device. In other words, differences between the perceived sound locations and the emitted (actual) sound location can be continuously monitored to further (dynamically) calibrate the virtual reality device (i.e., update the user ear model) during an operational use of the virtual reality device. Thus, some embodiments, can utilize the positional feedback of the virtual reality unit to dynamically adjust parameters (i.e., geometric variables in a user ear model) to improve sound localization accuracy. In this manner, the setup phase time can be reduced and/or the error tolerance can be increased, because the user ear model will dynamically be updated during the use of the device.

Figure 6:
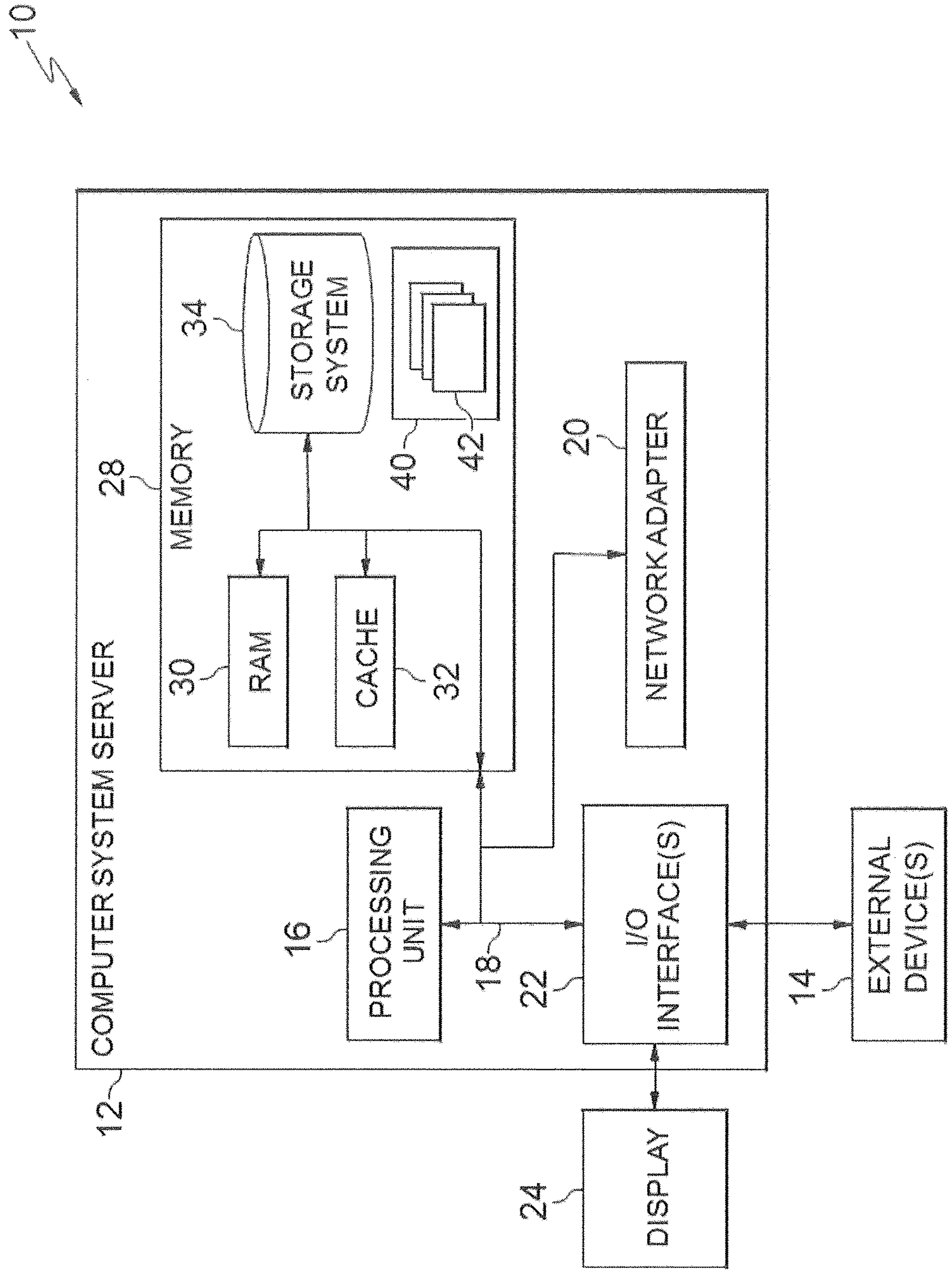
FIG. 6 exemplarily depicts a cloud computing node in accordance with some embodiments of the present invention.
Figure 7:
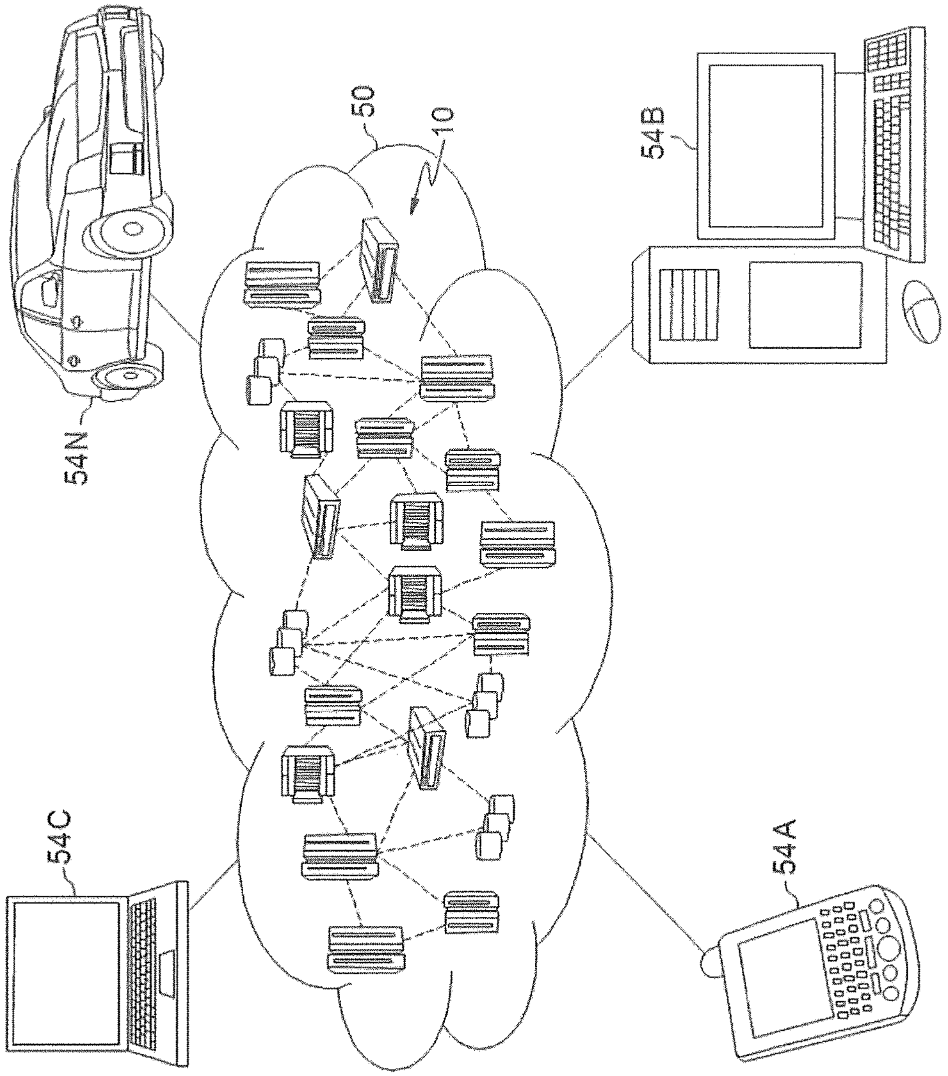
FIG. 7 exemplarily depicts a cloud computing environment in accordance with some embodiments of the present invention.

In step 103, either after the setup phase or during the operation phase, a user profile is created for the user ear model of the respective user. For example, a first user profile for the geometric variables of a first user's ear model can be created for later (re)use, thus avoiding a need to repeat the setup phase calibration. In some embodiments, a user profile is created after the setup phase, if the setup phase calibrates the user ear model within a tolerance level. In some embodiments, the tolerance level for creating a user profile can be set differently for an operational phase from that set during a setup phase. In some embodiments, a calibration made during the operation phase can further refine one or more geometric variables of a user ear model created during a setup phase, to create a more accurate user profile. It is noted that a so called "default ear model" can be used to play a first spectral tone at a location based on an average human's head/ear size. However, in some embodiments, a user profile can be input by the user from an external device (an example of which is depicted in FIG. 6) or downloaded from a cloud environment (an example of which is depicted in FIG. 7) to select a default ear model based on one or more personalized characteristics (e.g., demographic characteristics, height, weight, gender, etc.). By way of further example (only), the virtual reality device can include pre-loaded software that computes some of the geometric variables (examples of which are depicted in FIGS. 4-5), such as distance between ears (i.e., by determining a distance between headphones of a VR device).

In step 104, the first user profile is loaded to the virtual reality device if it is determined that the first user is using the virtual reality device a second time. If it is determined that a different user is using the virtual reality device and that user has a profile, it can be loaded and the setup phase avoided. By way of example only, virtual reality devices can be shared among members of a formal or informal social group and/or among participants in training exercises e.g., emergency (police, fire, medical, etc.) or military-related training exercises. In some embodiments, a retina scan can be used to determine if a different (already profiled) user is using the virtual reality device, in which case their profile can be dynamically loaded, thereby avoiding the setup phase. For example, if and existing profile for the different user is identified and loaded, a dynamic calibration e (e.g., as described in step 102) can proceed, but does not need to perform the setup phase calibration (e.g., as described in step 101).

In step 105, if it is determined that a second user is operating the virtual reality device that does not correspond to a profile, then the calibrating in the setup phase is performed for the second user (i.e., a new user).

The binaural audio calibration method 100 according to an exemplary embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Figure 2:
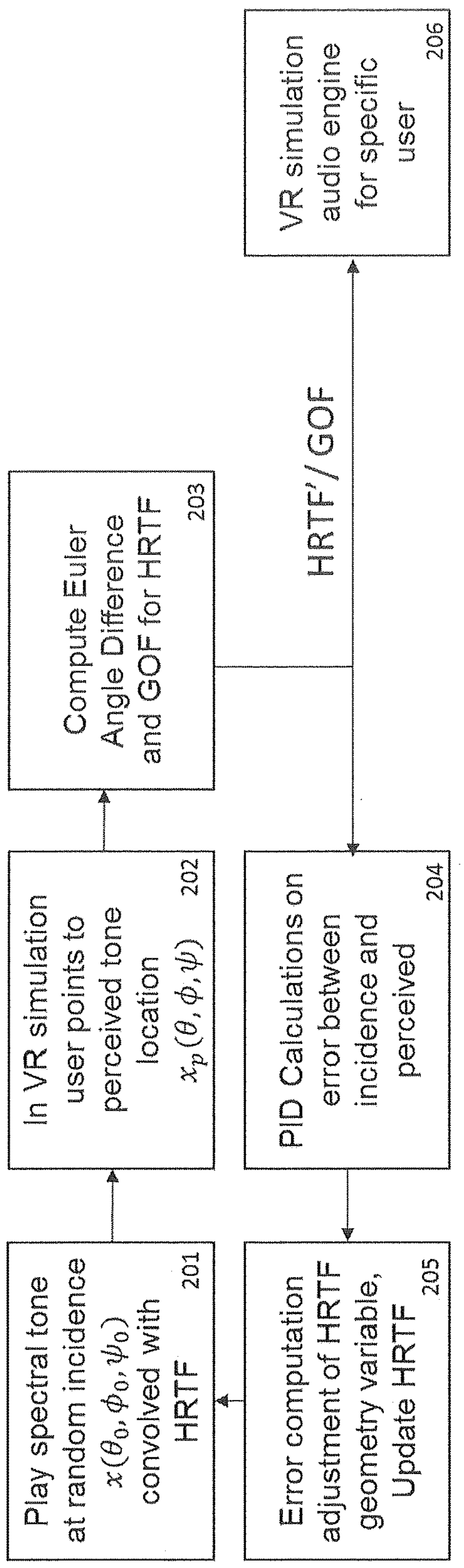
FIG. 2 shows another exemplary method in accordance with some embodiments of the invention.

FIG. 2 depicts another example of a method in accordance with some embodiments of the invention. By way of example only, steps 201-206 of FIG. 2 can calibrate the audio output for a specific user by building the calibration into game play or a virtual reality scenario (as an alternative to the setup phase of step 101 of FIG. 1). In some embodiments, feedback may be ongoing during the first few minutes of a VR experience until fully calibrated for the user ear model from the default ear model. By way of example only, an outdoor exploration scenario can be used where the user is set in a forest and a fly buzzes past such that the user compelled to look for it (i.e., a random spectral tone played). Accelerometer feedback from the headset can be tracked and project a pathway for the eyes when the user attempts to track the location of the sound (i.e., the perceived location). The delta between the projected pathway (feedback) and the expected pathway from the scenario (original input) is calculated and the control algorithm within the HRTF reduces the delta e.g., similar to how proportional-integral-derivative (PID) control systems prevent overshoot. By way of further example only, FIG. 2 can be considered as depicting another, more detailed example of the (HRTF-based) method described with reference to step 102 of FIG. 1.

Figure 3A:
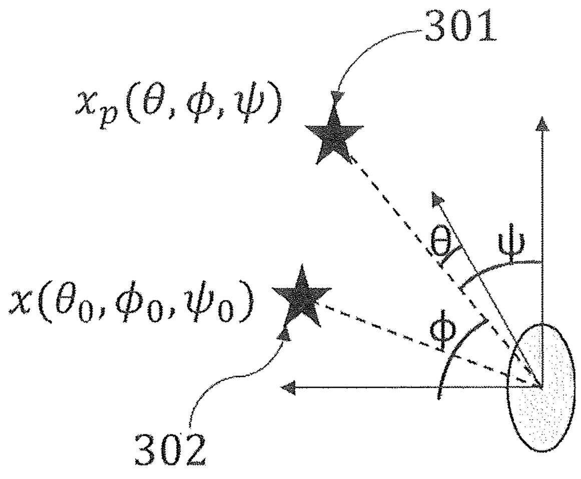
FIG. 3A exemplarily depicts a spectral tone and a perceived tone location in accordance with some embodiments of the invention.

FIG. 3A exemplarily depicts a spectral tone and a perceived tone location in accordance with some embodiments of the invention. More specifically, FIG. 3A depicts an example of a HRTF relating differences in sound pressure between a point source location and the perceived pressure at the left and right ears.

In some embodiments, steps 201-206 can calibrate the audio output for a specific user by creating an image (i.e., a star 302) in 3D virtual space coupled with a sound emitting from the location of the image. The user is requested to point to a location where they believe the sound came from (i.e., the perceived location at star 301). Steps 203-205 compute the error feedback and then play a new sound. The user is again requested to point to a perceived location. This process repeats until the error is less than a threshold (i.e., the user points to a location within a predetermined threshold of the sound). The geometric variables used for the user's ear and geometry of their head in the HRTF is saved as the user ear model.

Thus, a calibration in accordance with the present invention (whether performed during a setup phase and/or during an operational phase) can create a more immersive experience by increasing sound location accuracy.

In some embodiments (as noted above), the perceived sound location can be determined based on the user pointing to a location of the perceived sound e.g., in a game scenario. However, the invention is not limited thereto. In some embodiments, a directional gaze detection capability of the virtual reality device, e.g., eye tracking technology, etc. can be used to track where the user perceives the sound to be located in the virtual reality simulation.

Referring now to FIGS. 2-3, in step 201 of FIG. 2, a spectral tone is played (in some embodiments) during the simulation of the virtual reality device, at a random location having a random incidence $x(\theta_0,\phi_0,\psi_0)$ convolved with the head related transfer function (HRTF). In step 202, (in some embodiments) during the virtual reality simulation, the user is requested to point at the perceived location $x_p(\theta,\phi,\psi)$ of the spectral tone. It is noted that in some embodiments, in addition to the user pointing or alternately to the user pointing, the user's head motion, eye motion, etc. can be tracked in order to determine a perceived location of the sound.

Figure 3B:
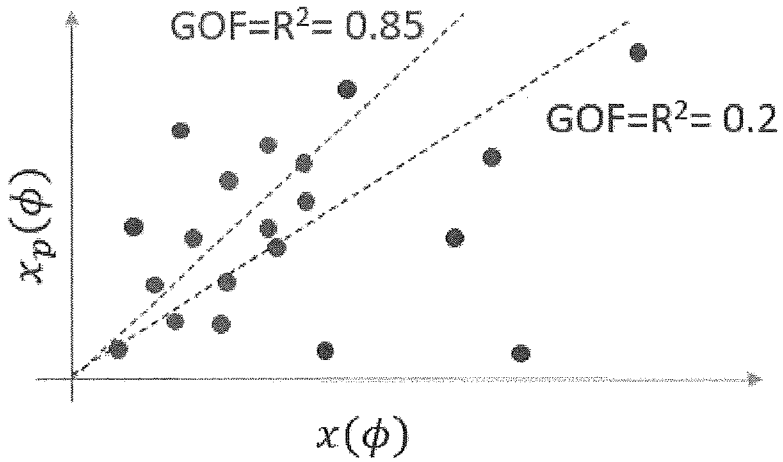
FIG. 3B exemplarily depicts a goodness-of-fit (GOF) computation for a coefficient $R^2$.

In step 203, the Euler angle difference (e.g., as shown in FIG. 3A) and the goodness-of-fit (GOF) is computed for the HRTF (e.g., as exemplarily depicted in FIG. 3B). For example, as shown in FIG. 3A, the spectral tone is played at 302 and the user perceives the spectral tone at 301. The difference (i.e., the Euler angle difference between the first perceived location and the actual location depicted in FIG. 3A) between the two locations is calculated and run through the HRTF.

As exemplarily shown in FIG. 3B, the coefficient of determination $R^2$ for a linear regression model with one independent variable is $R^2=\{(1/N)*\Sigma[(xi-x)*(yi-y)]/(\sigma_y*\sigma_x)\}^2$, wherein N is the number of operations used to fit the model, Σ is the summation symbol, xi is the x value for the observation i, x is the mean x value, $y_i$ is the y value for observation I, y is the mean y value, $\sigma_x$ is the standard deviation of x, and $\sigma_y$ is the standard deviation of y.

In step 204, the proportional-integral-derivative (PID) calculations are performed on the error between the incidence and the perceived location. In step 205, an error computation is performed to adjust the HRTF geometry variable and update the HRTF. In other words, a new set of geometric constraints in the HRTF are set in place of the default ear model to reduce the error between the spectral tone location and the perceived tone location. Then, the process repeats for the new geometry variables. When the error computation is below a threshold, the geometry variables are set as the user ear model. That is, the perceived location of the spectral tone and the spectral tone location match (or are within a predetermined threshold).

In step 206, the user ear model is saved and set e.g., for the applicable audio engine and the specific user.

As shown in at least FIG. 6, one or more computers of a computer system 12 according some embodiments of the present invention can include a memory 28 having instructions stored in a storage system to perform one or steps of the method depicted in FIG. 1 and/or FIG. 2.

Although one or more embodiments (see e.g., FIGS. 6-8) may be implemented in a cloud environment 50 (see e.g., FIG. 7), it is nonetheless understood that the present invention can be implemented outside of the cloud environment. In contrast, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 6 depicts a an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types.

Computer system/server 12 may be practiced in cloud computing environments (see e.g., FIG. 6) where tasks are performed by remote processing circuits that are linked through a communications network. In a distributed cloud computing environment, program modules may be located in both local and remote computer system storage media including memory storage circuits.

Referring again to FIG. 6, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 18 by one or more data media interfaces. As depicted, memory 28 may embody/store program/utility 40, that further includes a set (i.e., of one or more) program modules 42. The program modules 42 may embody one or more application programs configured to carry out one or more functions and/or methods of the present invention. By way of example, and not limitation, such application programs may be embodied as computer software that when executed, practices one or more of the steps depicted in FIG. 1 and/or FIG. 2. By way of further example, and not limitation, program/utility 40 may also include an operating system, one or more other application programs, other program modules, and/or data. Each of the operating system, one or more application programs, other program modules, and program data or some combination thereof, may include implementation in a networking environment.

Computer system/server 12 also includes input/output (I/O) interfaces 22 and network adapter 20 that facilitate communication with system users and/or one or more external devices 14. In other words and by way of example only, input/output (I/O) interfaces 22 generally facilitate user (and other) interaction with computer system/server 12; and include components (e.g., network card, modem, etc.) that enable computer system/server 12 (and/or users thereof) with network adapter 20, to communicate with one or more other external devices (and/or users thereof). A few examples of such external devices include: nodes, devices and computer systems servers; vehicle sensor(s); a keyboard, a pointing circuit, a display 24, and other devices. As depicted in FIG. 6, network adapter 20 can communicate with other components of computer system/server 12 via bus 18.

It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc. Examples of networks include (but are not limited to) a local area network (LAN), a general wide area network (WAN), and/or a public network (e.g., the Internet). Examples of a network (cloud) implementation will be described in detail with reference to FIG. 7.

Referring now to FIG. 7, illustrative cloud computing environment 50 is depicted. As shown, cloud computing environment 50 comprises one or more nodes 10 (e.g., computer system 12 (FIG. 7) with which computing circuits and/or computing devices used by cloud consumers—such as, for example, personal digital assistant (PDA) or cellular telephone 54A, desktop computer 54B, laptop computer 54C, and/or automobile computer system 54N—may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
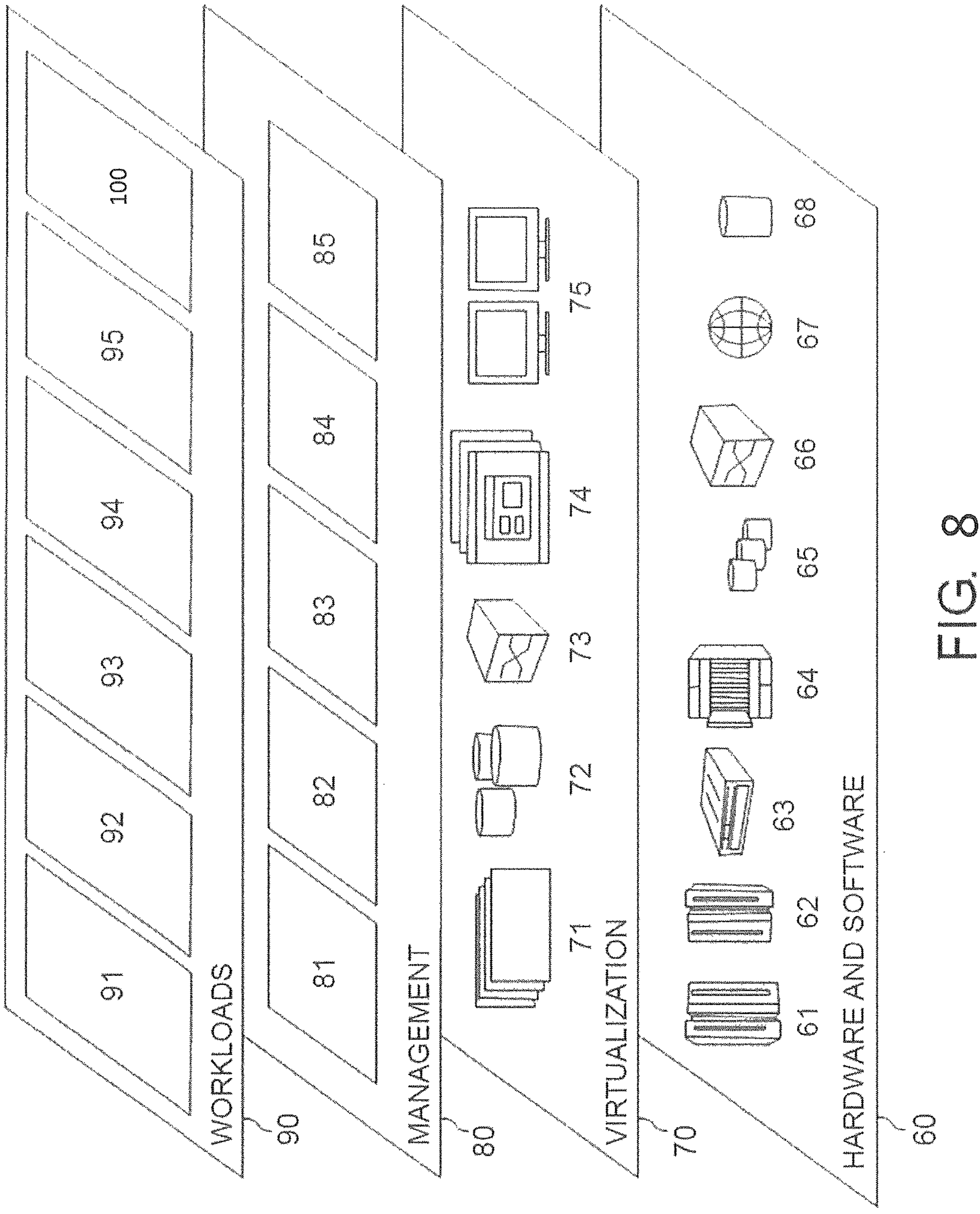
FIG. 8 exemplarily depicts abstraction model layers in accordance with some embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, one or more workloads and/or functions in accordance with the present invention 100, e.g., of the methods depicted in FIG. 1 and/or FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for calibrating audio of a virtual reality device, the method comprising:
- providing a default ear model;
- emitting, by the device, an audible tone and a created image in a virtual space coupled with the audible tone emitted from a location of the created image, based on the default ear model;
- determining a difference between a perceived tone location and an actual audible tone location, in response to said emitting;
- creating and calibrating a user ear model for the device, based on a head-related transfer function and a determined difference between the perceived tone location and the actual audible tone location, in response to said determining; and
- creating a user profile for the user ear model, in response to said creating and calibrating,
- wherein the actual audible tone location was derived from a calibration by determining the perceived tone location of a previous tone and the actual audible tone location of the previous tone.

2. The computer-implemented method of claim 1, wherein said creating a user profile further comprises creating the user profile when the determined difference is less than a threshold value.

3. The computer-implemented method of claim 1, wherein the tone comprises a spectral tone and said creating and calibrating a user ear model further comprises:
- emitting the spectral tone at a random time during a simulation by the virtual reality device;
- determining the perceived tone location during the simulation;
- computing a Euler angle difference and a goodness-of-fit (GOF) for the head-related transfer function;
- performing a proportional-integral-derivative (PID) calculation on the difference between the perceived tone location and a location of the spectral tone; and
- computing an error adjustment for one or more geometric variables of the default ear model in the head-related transfer function.

4. The computer-implemented method of claim 3, wherein the calibrating repeats using adjusted geometric variables until the difference between the perceived tone location and the spectral tone location is less than a threshold value.

5. The computer-implemented method of claim 1, wherein a difference between the default ear model and the user ear model includes a difference between geometric variables representing a first user and geometric variables representing a default user.

6. The computer-implemented method of claim 1, further comprising:

loading a first profile to the virtual reality device if it is determined that a first user is using the virtual reality device a second time; and if a second user is determined as operating the virtual reality device, performing a calibrating of a setup phase for the second user.

7. The computer-implemented method of claim 1, embodied in a cloud-computing environment.

8. A non-transitory computer program product for binaural audio calibration of a virtual reality device, the computer program product comprising a computer-readable storage medium having program instructions embodied therewith, the program instructions executable by a computer to cause the computer to perform:

providing a default ear model;

emitting, by the device, an audible tone and a created image in a virtual space coupled with the audible tone emitted from a location of the created image, based on the default ear model;

determining a difference between a perceived tone location and an actual audible tone location, in response to said emitting;

creating and calibrating a user ear model for the device, based on a head-related transfer function and a determined difference between the perceived tone location and the actual audible tone location, in response to said determining; and creating a user profile for the user ear model, in response to said creating and calibrating, wherein the actual audible tone location was derived from a calibration by determining the perceived tone location of a previous tone and the actual audible tone location of the previous tone.

9. The non-transitory computer program product of claim 8, wherein said creating a user profile further comprises creating the user profile when the determined difference is less than a threshold value.

10. The non-transitory computer program product of claim 8, wherein the tone comprises a spectral tone and said creating and calibrating a user ear model further comprises:

emitting the spectral tone at a random time during a simulation by the virtual reality device;

determining the perceived tone location during the simulation;

computing a Euler angle difference and a goodness-of-fit (GOF) for the head-related transfer function;

performing a proportional-integral-derivative (PID) calculation on the difference between the perceived tone location and a location of the spectral tone; and computing an error adjustment for one or more geometric variables of the default ear model in the head-related transfer function.

11. The non-transitory computer program product of claim 10, wherein the calibrating repeats using adjusted geometric variables until the difference between the perceived tone location and the spectral tone location is less than a threshold value.

12. The non-transitory computer program product of claim 8, wherein a difference between the default ear model and the user ear model includes a difference between geometric variables representing a first user and geometric variables representing a default user.

13. The non-transitory computer program product of claim 8, further comprising:

loading a first profile to the virtual reality device if it is determined that a first user is using the virtual reality device a second time; and if a second user is determined as operating the virtual reality device, performing a calibrating of a setup phase for the second user.

14. A binaural audio calibration system for calibrating audio of a virtual reality device, said system comprising:

a processor; and a memory operably coupled to the processor, the memory storing program instructions that when executed cause the system to:

providing a default ear model;

emitting, by the device, an audible tone and a created image in a virtual space coupled with the audible tone emitted from a location of the created image, based on the default ear model;

determining a difference between a perceived tone location and an actual audible tone location, in response to said emitting;

creating and calibrating a user ear model for the device, based on a head-related transfer function and a determined difference between the perceived tone location and the actual audible tone location, in response to said determining; and creating a user profile for the user car model, in response to said creating and calibrating, wherein the actual audible tone location was derived from a calibration by determining the perceived tone location of a previous tone and the actual audible tone location of the previous tone.

15. The system of claim 14, wherein said creating a user profile further comprises creating the user profile when the determined difference is less than a threshold value.

16. The system of claim 14, wherein the tone comprises a spectral tone and said creating and calibrating a user ear model further comprises:

emitting the spectral tone at a random time during a simulation by the virtual reality device;

determining the perceived tone location during the simulation;

computing a Euler angle difference and a goodness-of-fit (GOF) for the head-related transfer function;

performing a proportional-integral-derivative (PID) calculation on the difference between the perceived tone location and a location of the spectral tone; and computing an error adjustment for one or more geometric variables of the default ear model in the head-related transfer function.

17. The system of claim 16, wherein the calibrating repeats using adjusted geometric variables until the difference between the perceived tone location and the spectral tone location is less than a threshold value.

18. The system of claim 14, wherein a difference between the default ear model and the user ear model includes a difference between geometric variables representing a first user and geometric variables representing a default user.

19. The system of claim 14, further comprising:

loading a first profile to the virtual reality device if it is determined that a first user is using the virtual reality device a second time; and if a second user is determined as operating the virtual reality device, performing a calibrating of a setup phase for the second user.

20. The computer-implemented method of claim 1, wherein the tone comprises a spectral tone and said creating and calibrating a user ear model further comprises:

computing an error adjustment for one or more geometric variables of the default ear model in the head-related transfer function.

* * * * *